Dec. 9, 1958   J. L. ELLIS ET AL   2,863,563
FILTER

Filed June 26, 1953                                3 Sheets-Sheet 1

INVENTORS
JOHN L. ELLIS
CLAUS G. GOETZEL
BY Paul Kolisch
ATTORNEY

Dec. 9, 1958  J. L. ELLIS ET AL  2,863,563
FILTER
Filed June 26, 1953  3 Sheets-Sheet 2
FIG. 3.
FIG. 4.
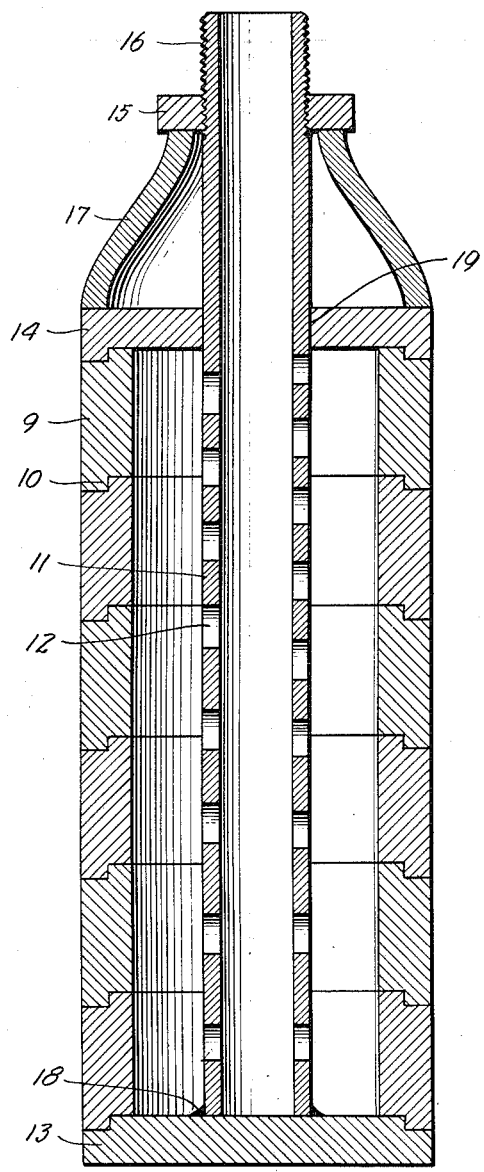
INVENTORS
JOHN L. ELLIS
CLAUS G. GOETZEL
BY
Paul Kolisch
ATTORNEY Dec. 9, 1958     J. L. ELLIS ET AL     2,863,563
FILTER Filed June 26, 1953     3 Sheets-Sheet 3

INVENTOR.
JOHN L. ELLIS
CLAUS J. GOETZEL
BY
Paul Kolisch
ATTORNEYS

United States Patent Office 2,863,563
Patented Dec. 9, 1958

2,863,563

FILTER

John L. Ellis, White Plains, and Claus G. Goetzel, Yonkers, N. Y., assignors to Sintercast Corporation of America, Yonkers, N. Y.

Application June 26, 1953, Serial No. 364,284

12 Claims. (Cl. 210—496)

The present invention relates to the production of porous metallic filter plates for use in corrosive media, and more particularly to porous metal-like filters which may be fabricated into strongly jointed filter plate assemblies.

In many chemical processes, particularly processes involving corrosive media, filters are employed in the separation of certain phases, including the separation of finely divided solid particles from corrosive liquid phases, vapor phases or gaseous phases. In processes involving high reaction temperatures, the problem of obtaining filter materials having the desired resistance to heat, to corrosion, and to mechanical and thermal shock is particularly acute and presents many difficulties. This is especially true in providing filters for processes involving corrosive hot hydrocarbon vapors or liquids produced by the pyrolysis or cracking of hot hydrocarbons in the presence of a fluidized catalyst. Many of these processes are continuous and require the separation of the finely divided catalyst from effluent gaseous and/or liquid products for recirculation back into the system. Filters employed under such conditions must have certain requisite properties in order to achieve the separation of solids or other phases from corrosive hot hydrocarbon materials economically and satisfactorily. Hydrocarbons containing small amounts of sulfur in either the oxidizing or reducing condition further compound the corrosion difficulties, particularly at elevated temperatures. For example, under one operating condition of fluid catalysis involving a corrosive oxidizing hydrocarbon gas containing $SO_2$ and/or $SO_3$, an elevated temperature of about 1100° F. is employed with operating pressures varying up to as high as 500 pounds per square inch (p. s. i.). Under another operating condition involving a corrosive reducing hydrocarbon gas containing $H_2S$, an operating temperature of about 950° F. is employed also with high pressures up to about 500 p. s i. Both types of sulfur-containing hydrocarbon gases caused severe chemical attack of many proposed metallic filter materials.

A filter comprised of stainless steel containing about 18% chromium, 8% nickel and 1% columbium, normally considered corrosion resistant in many applications, was inadequate when employed as a filter in the aforementioned type chemical processes. The filter was attacked by sulfur-containing gases, particularly in the surface region to such extent as to interfere with economical operation. Filters comprised of substantially all tungsten or all molybdenum likewise were not suitable because these materials tended to oxidize destructively at elevated temperatures.

Attempts at employing inorganic non-metallic filters of the ceramic type were not too successful for, while ceramic filters appeared to have the necessary corrosion resistance, they frequently failed to resist mechanical and thermal shock on account of their inherent brittleness. There were additional disadvantages. For instance, in producing ceramic filter assemblies, it was difficult to obtain good ceramic-to-metal bond and such filters tended to fail at the bonded joint during service due to poor bonding, fluctuating service temperatures, differences in expansivity at and near the bonded joint, mechanical vibration, etc. Because of the aforementioned difficulties it was apparent that filter materials not only had to have adequate resistance to chemical corrosion, disintegration, etc., but in addition also had to have uniform porosity and permeability. It was also apparent that filter materials had to have adequate physical properties including adequate mechanical strength at room and elevated temperatures. It was furthermore apparent that filter materials had to be brazable or weldable or otherwise be capable of being joined into large filter units and be particularly capable of being joined to solid wrought or cast metal materials in the production of large filter plate assemblies. While the type of properties desired in such filters indicated that only metal-like filter materials would be satisfactory, none of the materials proposed, as far as we are aware, was entirely satisfactory when carried out in practice on a commercial scale.

We have discovered that metallic filters can be produced suitable for use in corrosive media and having the desired combination of physical and chemical properties, including adequate mechanical strength at room and elevated temperatures, resistance to mechanical and thermal shock, resistance to corrosive media, including sulfur-containing gases, etc. The metal-like filters produced in accordance with the invention are characterized by being amenable to ordinary fabrication methods in the production of large filters united by either brazing or other joining means, and capable of being strongly joined or bonded with certain solid metal materials in the production of large filter assemblies.

Other advantages of the invention will become apparent from the following description taken in conjunction with the accompanying drawings in which:

Fig. 3 is illustrative of an embodiment of a cylindrical type filter assembly comprising cylindrical porous filter segments of chromium-base material produced in accordance with the invention;

Fig. 4 illustrates a completed part of a porous filter unit produced in accordance with the invention.

Figure 1:
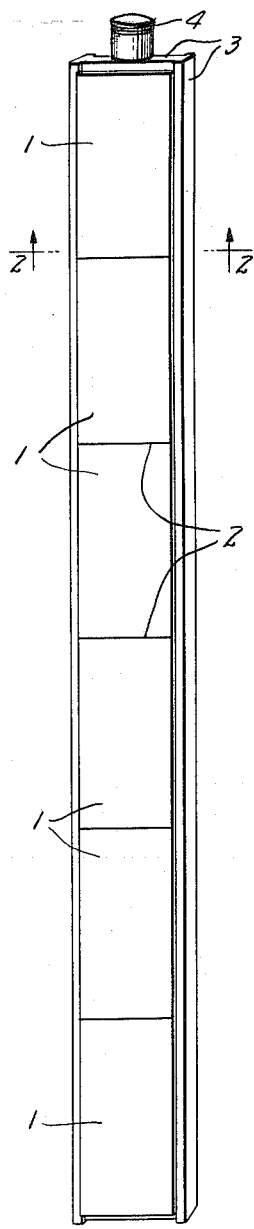
Fig. 1 is a drawing showing an embodiment of one type of filter assembly comprised of porous filters of chromium base material produced in accordance with the invention.

In general the present invention contemplates a method for producing a metallic filter element containing substantial amounts of chromium, said filter element having substantially all of the properties necessary for operation in corrosive media. The invention also contemplates the novel product produced by the method.

We have discovered that a filter element of greatly improved properties can be obtained by employing chromium-base material in comminuted form and whose chromium content is at least 80%. However, to achieve the results of the invention, it is preferred that the porous chromium-base material be free from nickel, although up to 5% nickel may be tolerated in the chromium-base material without substantially deleteriously affecting the corrosion resistance of the filter element in corrosive sulfur-containing gaseous atmospheres at elevated temperatures. The chromium-base material may contain such metallic elements as iron up to 5%, cobalt up to 5%, molybdenum up to 5%, and tungsten up to 5%, the total amounts of these elements including nickel not exceeding 10% by weight.

In carrying the invention into practice it is preferred that comminuted electrolytic chromium be employed as the chromium-base starting material. Two types of electrolytic chromium containing chromium in excess of 98% which have been found to give satisfactory results are a flake type and a nodular type powder having the following chemical analysis:

| Element | Type | |
|---|---|---|
| | Flake, percent | Nodular, percent |
| Chromium | 99.25 | major |
| Copper | 0.01 | 0.001 |
| Iron | 0.08 | 0.01 |
| Antimony | 0.11 | |

The condition of the chromium-base powder material prior to hot pressing is important in that the powder employed must be in a stabilized condition if consistent and reproducible results are to be obtained. If virgin, i. e., unstabilized, electrolytic chromium powder is employed in producing porous hot-pressed bodies, such bodies tend to crack during hot pressing or tend to crack thermally when subjected to heat shock in subsequent operations. While the atmospheric condition during hot pressing is controlled to a limited extent, the unstabilized chromium-base powder material undergoes a change at elevated temperatures by reaction with residual nitrogen and/or carbon-containing gases in the mold whereby a non-uniform product is formed of varying degrees of allotropy resulting in anisotropic properties which give rise to non-uniform thermal stresses during cooling. Porous bodies produced from unstabilized chromium-base powder generally crack either during cooling after hot pressing or when subjected to thermal treatment during brazing or other heating operations. Thus, by employing a chromium-base powder in the stabilized condition, uniform bodies with uniform properties can be produced. Such stabilized chromium powders usually contain anywhere from about 85% to 91% chromium, the balance comprising substantial amounts of nitrogen and generally lesser amounts of oxygen and carbon. Stabilized electrolytic chromium-base powders comprising from about 4 to 9% nitrogen, up to 2% carbon, up to 3% oxygen and chromium in excess of 85% have been found satisfactory in producing porous hot pressed bodies.

In producing porous bodies or filter elements in accordance with the invention comprised of a substantially intercommunicating pore system, a chromium-base material is selected having particles passing through 60 mesh, and preferably within the range of size distribution between minus 60-mesh to plus 200-mesh. A predetermined amount of the material is then placed into a graphite mold protected with a surface coating of a substantially non-reacting ceramic, e. g., alumina, and a similarly protected graphite plunger inserted into the mold and the whole heated to a temperature of about 1300° C. to 1500° C.

Sufficient pressure is applied to the plunger to compress the chromium-base material to an apparent density corresponding to a density of about 50% to 80% of the actual density of the material. In a chromium-base material containing about 85% to 91% chromium and substantially the balance being nitrogen, carbon and oxygen plus small amounts of incidental elements, actual densities may range from about 6.1 to 6.2 grams/cm.$^3$. By employing mechanical stops on the press to control the displacement of the plunger, materials of controlled porosity and permeability can be produced. Pressures which have been found adequate range from about 400 p. s. i. to 1200 p. s. i. The amount of pressure applied during the heating up period may be at least about 400 p. s. i. while a pressure of 1100 p. s. i. has been found adequate at the hot pressing temperature. The desired porosity is determined by calculation beforehand and depends upon the actual density of the chromium-base material, the weight of the material employed, and the final size and apparent density of the plate. Thus, assuming that the chromium-base material contains between 85% and 91% metallic chromium and has an average density of about 6.15 grams per cubic centimeter (grams/cm.$^3$) and a hot pressed plate having an apparent density of about 60% of true density is desired (40% porosity), the hot pressing would be controlled by the mechanical stops on the press so that the density of the final volume to which the material is pressed will correspond to an apparent density of about 3.69 grams/cm.$^3$ or six-tenths that of the actual density of the material. Likewise, if a density of 80% of actual density is desired, the hot pressing would be similarly controlled so that an apparent density of about 4.92 grams/cm.$^3$ is obtained (20% porosity). In producing the desired porosities in this manner, the absolute value of the ultimate pressure is not too critical as long as it is great enough to overcome the resistance of the powder to pressure packing.

The soaking time at temperature is important, particularly since the bonding of the chromium powder is generally difficult to achieve under ordinary hot pressing conditions. Metallic binders cannot be used in effecting bonding between the particles as in regular powder metallurgical operations because they tend to be detrimental to the final properties and to lower the resistance of the filter plates to sulfur corrosion. Soaking times of about 7 minutes to 20 minutes for temperatures of about 1350° C. to 1450° C. have been found to give satisfactory hot pressed bodies. Upon completion of the hot pressing operation, the mold and the contained plate is furnace cooled in a protective environment. Such a protective environment may comprise a reducing atmosphere of hydrogen. Or the protective environment may be a high temperature insulating powder material into which the mold and the contained plate may be embedded. A powder material known by the trade-mark "Norblack" comprising a specially treated type of ultra fine carbon powder has been found satisfactory.

When producing filter plates by the aforementioned hot pressing method, the chromium-base powder is generally subjected to a stabilizing heat treatment prior to employing it in the hot pressing operation. In stabilizing the chromium-base material, a powder of selected particle size distribution falling within the range of about minus 60-mesh to plus 200-mesh is subjected to heating at a temperature in the range of about 1300° C. to 1500° C. for about 15 minutes to 60 minutes at temperatures in a protected container, for example a ceramic coated graphite crucible, in an atmosphere at least partially reactive with the chromium-base material. The heating is controlled so that the chromium-base material effects a gain in weight amounting to about 10% to 15% after completion of the heating. It is preferred when treating the chromium-base material that it be heated in a nitrogen-containing atmosphere capable of nitriding the chromium in the material. In general, an atmosphere comprising substantially all nitrogen may be employed, although a diluted nitrogen atmosphere is also suitable. If desired, a carbon containing atmosphere may partially replace the nitrogen-containing atmosphere to carburize partially the metallic chromium in the material. Such atmospheres may contain carbon monoxide or such other form of carbon-containing gases as the more common hydrocarbon gases. Also, the atmosphere may be partially oxidizing to the chromium. Whatever the atmosphere, the heating must be so controlled that the gain in weight of the chromium base material is of the order of about 10% to about 15%. The material must not lose its metallic properties, otherwise the resulting filter plate is detrimentally affected. Thus, by heating the chromium-base material in nitrogen-containing atmosphere, a stabilized metallic material is obtained.

The stabilized chromium-base material produced in the foregoing manner is then disintegrated by grinding or other suitable means from which a powder of selected particle size distribution can be obtained ranging from about minus 60-mesh to plus 200-mesh for use in the production of filter plates by the hot pressing and sintering methods disclosed hereinbefore. As has been pointed out earlier, plates produced from the stabilized chromium-containing materials are characterized by being brazable or otherwise joinable by heat-applied means without much difficulty. Such filter plates are not only joinable to each other but can also be joined to certain solid metal components.

If it is desired to produce a porous filter plate of uniform strength properties, the plate after completion of hot pressing may be subjected to a high temperature heat treatment or sintering in order to produce additional diffusion bonds at the points of contact between the chromium-base particles in the body and to reduce any interference films, such as free carbon, on the exposed surface of the filter to render the filter plate amenable to joining by brazing or other means. The heat treatment or sintering may be carried out at about 1110° C. to 1500° C. for about 10 minutes to 60 minutes while at temperature. A non-oxidizing atmosphere, e. g., hydrogen, helium, etc., may be employed which may be at a subatmospheric pressure of less then 700 microns of mercury column. To prevent warping of the plate during sintering, tungsten weights or other suitable weight or pressure may be applied to the plate. A load corresponding to a pressure of at least about 0.05 pound per square inch of plate surface has been found satisfactory during the heat treatment or sintering.

Of course, it will be appreciated that a chromium-base material containing at least about 80% chromium may contain one or more of the stabilizing elements in addition to one or more such other elements stated hereinbefore.

For a porous filter to be servicable it must have certain properties which are usually determined and controlled by the physical characteristics of the material employed in making the filter, such as its grain size, its apparent density, etc., although to a large extent the properties are determined by fabrication methods. In determining the suitability of a filter for service, certain correlative properties are relied upon. These properties are usually represented by apparent density, standard flow-rate measurements of a gas (gas permeability) through the porous filter, certain strength properties, e. g., rupture or shear strength and, of course, its properties with respect to brazability or other types of joining by the application of heat.

For the purpose of giving those skilled in the art a better understanding of the invention, the following illustration examples are given:

Sample filters were prepared from two types of chromium powder, one an electrolytic powder the other a powder prepared from a cast ingot of chromium. Various size fractions of the powders were employed in producing the filters. A given weight of the powder was placed in an alumina-coated graphite mold and hot pressed with a similarly protected graphite plunger to a predetermined apparent density at a temperature in the range of 1100° C. to 1400° C. for about 2 to 10 minutes. The porous plate produced was cooled, removed from the mold and then subjected to a special gas permeability pressure-drop test which comprised passing nitrogen through a section of the filter measuring about one and one-half inches in diameter and about one-eighth in thickness. The nitrogen was gaged to a 5 pound back pressure through a pressure reducing and regulating valve at a flow rate through the filter of about 5 liters per minute. The pressure drop across the one-eighth inch thick filter (also referred to as the permeability factor) was measured by a U-gage in inches of mercury column. The following results were obtained:

Table I

| No. | Type Powder | Mesh size | Apparent Density (Percent True Density) | Permeability Factor, Inches Hg |
| --- | --- | --- | --- | --- |
| 1 | Electrolytic Chromium | −100 +325 | 67.0% | 1.88 |
| 2 | do | −100 +325 | 70.8% | 2.25 |
| 3 | Cast Chromium | −100 +200 | 63.8% | 1.50 |
| 4 | do | −100 +200 | 67.1 | 2.13 |
| 5 | do | −100 +200 | 64.0 | 1.75 |
| 6 | do | −100 +200 | 60.4 | 1.12 |
| 7 | do | −100 +200 | 55.8 | 0.56 |
| 8 | do | −100 +200 | 62.0 | 1.12 |
| 9 | do | −100 +200 | 59.5 | 0.87 |
| 10 | do | −100 +200 | 60.5 | 0.87 |
| 11¹ | Electrolytic Chromium | −60 +80 | 61.2 | 0.63 |
| 12¹ | do | −60 +80 | 60.8 | 0.53 |

¹ Filters 11 and 12 unlike filters 1 and 2 to 10 were hot pressed in an alumina-coated mold for 8 minutes at 1300°C. followed by sintering in hydrogen for 1 hour at 1200° C. whereby the surface films on the filter were also reduced.

Of the foregoing filters produced and tested, filters 5 to 10 and filters 11 and 12 indicated satisfactory results with the best results being achieved by filters 11 and 12 with respect to both the apparent density and the permeability factor. The tests indicated that the particle size was important and should preferably fall within the range of about minus 60-mesh to plus 200-mesh, the best results being obtained in the range of about minus 60-mesh to plus 80-mesh. The tests also indicated that heating the filters 11 and 12 in hydrogen at 1200° C. produced more uniform strength properties as compared to the filters which were not so treated. All samples were characterized by having a metallic ring, particularly 11 and 12.

In determining the suitability of a filter to operate at elevated temperatures in a sulfur-containing atmosphere, comparative tests were resorted to simulating operating conditions. One such test which has been found very satisfactory in evaluating filters comprises passing a measured amount of an oxidizing sulfur-containing gas through a filter at atmospheric pressure and at an elevated temperature of about 1100° F. over a period of about 6 to 7 days. In testing chromium filter samples 5 to 8, a gas analyzing about 72.7% $N_2$, 10.8% $CO_2$, 12.2% $H_2O$, 2.75% $SO_2$ and 1.54% $SO_3$ was employed. During the test which lasted 161.5 hours, a total of 141.7 gram mols of gas was passed successively through each filter at a temperature of about 1100° F. A control filter produced from stainless steel powder containing about 18% chromium, 8% nickel, 1% columbium and having an apparent density of about 51% to 57% of true density correlated with a permeability factor of about 0.43 to 0.5 was tested simultaneously with the aforementioned filters. The corrosive effect of the sulfur-containing gas on the filter was determined as percent gain in weight. The results obtained are set forth in Table II as follows:

Table II

| Material | Percent Increase in Weight |
| --- | --- |
| 5 | 3.7 |
| 6 | 3.5 |
| 7 | 4.7 |
| 8 | 3.4 |
| Stainless Steel | 18.9 |

It will be noted from Table II that the chromium filter samples 5 to 8 exhibit marked resistance to corrosion of oxidizing, sulfur-containing gas, while the stainless steel filter exhibits extremely poor resistance to corrosion.

In another similar group of tests, chromium filter samples 9 and 10 were compared to filters produced from electrolytic iron powder. In preparing the iron filters (13 to 17), a flaky type of iron powder passing through a 60-mesh screen was employed. The iron powder was mixed with a small amount of plastic binder, pressed to shape in a steel die and the shaped filters produced buried in a powder pack acting as a "getter," consisting of a 50-50 mixture of chromium powder and alumina grains, and sintered at about 1200° C. in a desiccated hydrogen atmosphere. The iron filters had the following properties:

Table III

| No. | Type of Powder | Mesh Size | Apparent Density | Permeability Factor, Inches Hg |
| --- | --- | --- | --- | --- |
| 13 | Electrolytic Iron | Minus 60 | 59.7 | 2.0 |
| 14 | do | do | 56.4 | 2.0 |
| 15 | do | do | 56.4 | 2.24 |
| 16 | do | do | 51.1 | 0.75 |
| 17 | do | do | | |

The gas employed in testing chromium filters 9 and 10 and the iron filters (13 to 17) analyzed about 71.3% $N_2$, 10.8% $CO_2$, 11.8% $H_2O$, 4.6% $SO_2$ and 1.50% $SO_2$. A total of 111.5 gram mols of the gas were passed through the filters successively at a temperature of about 1100° F. at atmospheric pressure over a period of 160 hours. The following results were obtained:

Table IV

| Material | Percent Gain in Weight |
| --- | --- |
| 9 | 5.0 |
| 10 | 7.3 |
| 13 | 16.0 |
| 14 | 12.8 |
| 15 | 14.8 |
| 16 | 19.4 |
| 17 | 26.5 |

It will be noted from Table IV that the iron filter (13 to 17) exhibit inferior resistance to sulfur corrosion as compared to chromium filters 9 and 10 which show markedly high resistance to the corrosive sulfur-containing gas.

Reducing sulfur-containing gases, i. e., reducing gases containing sulfur in the form of $H_2S$ are generally considered more corrosive to metal filters than oxidizing sulfur-containing gases. The effect of such reducing gases was determined on chromium filters 11 and 12 as well as on the aforementioned stainless steel control sample. The gas employed in the test contained 5 mol percent $H_2S$ and 95 mol percent $H_2$. The test was carried out under atmospheric pressure at a temperature of about 950° F. over a period of 168 hours during which 44.6 gram-mols of gas were passed through each filter successively. Upon the completion of the test, the control stainless steel filter indicated a weight increase due to corrosion of about 29.8% as compared to the two chromium filters which showed an average increase in weight due to corrosion of about 9.5%, about one-third that of the stainless filter or three times the resistance.

Tests have indicated that the corrosion resistance of chromium filters to reducing sulfur-containing gases can be further improved by subjecting the chromium filter to a pre-oxidizing treatment at an elevated temperature prior to its use. Chromium filters produced in accordance with the invention and then pre-oxidized at 1000° C. in still air from 1 to 24 hours were hardly affected by reducing sulfur-containing gases, the average weight gains after the corrosion test being substantially below 2%.

A given weight of electrolytic nodular type chromium was rod milled for two hours and then screened to remove the minus 60-mesh fraction. The plus 60-mesh fraction was further rod milled for two hours and again sieved to remove the minus 60-mesh fraction. The operation was repeated until sufficient minus 60-mesh plus 200-mesh material was obtained. This material was then placed in an alumina-coated graphite crucible and heated to 1450° C., and held at that temperature for about 30 minutes under a nitrogen atmosphere. The nitrogen-containing cake which formed had an increase in weight of about 12%. It was then broken into pieces of about one half to one inch in diameter and attrition ground in a small mill for one hour, screened to remove the minus 60-mesh fraction and the plus 60-mesh fraction remaining hand ground. After sufficient minus 60-mesh plus 200-mesh chromium powder was obtained, a suitable amount was weighed out for hot-pressing into a filter plate. The cromium powder had a nitrogen content of about 8.7%, and also about 1% oxygen and about 0.5% carbon, the chromium content being in excess of 88%.

Flat filter plates measuring 6″ x 3″ x ⅛″ thick were produced by loading sufficient amounts of the nitrogen-containing chromium powder into an alumina-coated graphite mold and heated to 1450° C. in 1 hour and 45 minutes. Load was applied in the order of 400 p. s. i. At temperature the load was increased to 1100 p. s. i. for a period of 15 minutes and then released while the mold soaked at temperature for an additional 15 minutes. The mold was then covered with a high temperature insulating powder and furnace cooled.

The hot pressed filter plate was then sintered for 30 minutes at 1200° C. in a technical vacuum of 500–700 microns of mercury by inserting the plate in a protected graphite box and weighing the plate with tungsten weights placed on top to prevent warping of the plate during sintering. The plate after completion of sintering had an apparent density of about 4.64 gr./cm.$^3$ corresponding to about 74% of true density and a permeability factor of 0.56 inch of mercury pressure drop as measured by the flow of nitrogen under a back pressure of 5 p. s. i. at a flow rate of 5 liters per minute through a substantially ⅛ inch section having a surface measuring 1.5 inches in diameter. While the plate contained slightly over 8% nitrogen, it had a decided metal-like luster and metal-like properties.

Analyses of stabilized chromium-base powders which have been employed in carrying out the invention are given in Table V as follows:

Table V

| Sample | Percent Cr | Percent N | Percent O | Percent C |
| --- | --- | --- | --- | --- |
| A | 88.7 | 8.7 | 1.0 | 0.54 |
| B | 86.9 | 7.6 | 2.3 | 1.9 |
| C | 86.8 | 7.8 | 2.8 | 1.7 |
| D | 91.6 | 4.1 | 2.2 | 1.3 |

In general, satisfactory results are obtained when the chromium-base powder is stabilized to a nitrogen content ranging from about 4% to 9% nitrogen. It is preferred that the chromium-base powder contain at least 4% nitrogen.

When producing chromium-base filters or porous bodies of controlled porosity having a substantially intercommunicating pore system, it is essential that the filter have an apparent density ranging from about 50% to 80% of the actual density of the chromium-base material when produced from powder having a particle size falling within the range of minus 60-mesh to plus 200-mesh. It is desired that the filter have a permeability factor corresponding to a pressure drop of about 0.3 to 2 inches of mercury as measured across a thickness of one-eighth of an inch of the filter and a surface of one and one half inches in diameter by the flow of nitrogen under a back pressure of 5 p. s. i. and a flow rate through the filter of 5 liters per minute. For a preferred apparent density range of 60% to 75% of actual density, a permeability factor corresponding to a pressure drop of about 0.5 inch to 1.1 inches of mercury is most desirable.

Filter plates having the aforementioned properties must have sufficient strength to enable them to be fabricated into larger filter units or assemblies. Rupture strength properties were obtained on specimens as hot pressed and on specimens as hot pressed and sintered. Test bars measuring 4" by ¼" by ¼" were prepared from both nodular type and flake type electrolytic chrominum powder of minus 60-mesh plus 200-mesh particle size and having apparent densities approximating those of the chromium filter plates produced in accordance with the invention. One group of specimens was hot pressed 8 minutes at 1300° C. in alumina-coated graphite molds while another group was similarly hot pressed followed by sintering for 30 minutes at 1200° C. while embedded in a pack of alumina and chromium powder mixed in equal proportions. The rupture strength obtained at room temperature is given in Table VI as follows:

*Table VI*

| Bar No. | Type Powder | Modulus of Rupture for Porous Chromium Test Bars Produced From −60 +200 Mesh Powder | | | | |
|---|---|---|---|---|---|---|
| | | As Pressed 8 Minutes at 1,300° C. | | As Sintered, 30 Minutes at 1,200° C. | | |
| | | Apparent Density, percent | Modulus of Rupture, p. s. i. | Apparent Density, percent | Atmosphere | Modulus of Rupture, p. s. i. |
| 18 | Flake | 69.5 | 16,800 | 69.0 | Hydrogen (dry). | 12,500 |
| | | 69.5 | 12,500 | 70.1 | Helium (dry). | 12,500 |
| | | 70.0 | 12,500 | 70.1 | Hydrogen.[1] | 17,500 |
| 19 | do | 69.3 | 9,900 | 71.8 | Hydrogen (dry). | 13,850 |
| | | 71.8 | 11,350 | 67.8 | Helium (dry). | 15,000 |
| | | 69.7 | 9,960 | 67.0 | Hydrogen.[1] | 12,450 |
| | | 68.8 | 12,500 | | | |
| 20 | Nodules | 69.2 | 11,200 | 68.3 | Hydrogen (dry). | 12,500 |
| | | 68.6 | 14,600 | 70.2 | Helium (dry). | 15,000 |
| | | 69.6 | 13,750 | | | |
| 21 | do | 67.7 | 12,500 | | Hydrogen (dry). | 15,000 |
| | | 70.0 | 9,160 | 67.8 | Helium (dry). | 11,200 |

[1] Commercial hydrogen.

It will be noted from Table VI that while the rupture strength values for the two groups of specimens were of the same order of magnitude, the material which was not pressed and sintered tended to have more uniform strength properties. In general, the filters produced in accordance with the invention will have a rupture strength (modulus of rupture) of at least 10,000 p. s. i. at room temperature.

In attempts at producing filter units or assemblies by employing heat applied joining methods, it was difficult to obtain good, sound, gas-tight joints. Among the prevailing difficulties were extreme gassing at the weld due to entrapped air from the porous filter and cracking after cooling of the weldment. The Heli-Arc process of welding with 18-8 stainless steel as the weldment presented such difficulties.

In determining a solution to the aforementioned problem, many heat joining tests were conducted. Pressure and solid state joining techniques were developed which enabled portions of porous chromium-base bodies to be joined together or joined with certain solid metal materials. In evaluating the ability of a porous chromium-base portion to be joined, test bars of the porous material were produced in accordance with the invention having apparent densities ranging from about 67 to 70% and joined by heat with or without applied pressure to various materials such as Inconel, Type 310 stainless steel and a special tungsten-nickel-copper alloy. Samples of each of the materials were placed on a bar of porous chromium material separated by a thin layer of a boron-containing nickel-chromium alloy powder and then hot pressed at 1030° C. to 1130° C. for about 5 minutes in dry hydrogen. The details and results are given in Table VII as follows:

*Table VII*

| No. | Type, Chromium | Apparent Density | Type of Joining | Remarks |
|---|---|---|---|---|
| 22 | Flake | about 70 | To type 310 stainless steel. | Distorted on cooling. |
| 23 | do | about 70 | To Inconel | Do. |
| 24 | do | 67.5 | To W-Ni-Cu alloy | Sound weld; No distortion. |

It will be noted the best joining results were obtained when the porous chromium-base material was joined to the tungsten-nickel-copper alloy which had a composition comprising about 90% tungsten, 7% nickel and 3% copper. Further tests have indicated that good results can be obtained in joining porous filter chromium material with a heat resistant solid metal material provided the solid metal has a controlled coefficient of linear thermal expansion (measured at 68° F. or room temperature) falling within the range of about 3.0 to about 5.5 microinches per inch per degree F. The tungsten-nickel-copper alloy has a coefficient of expansion in the neighborhood of about 3.1 microinches per inch per degree F. at about 68° F., while the porous chromium-base filter material has an expansion coefficient of about 4.6 microinches per inch per degree F. It is preferred that the coefficient of expansion be at least 5.0 and not exceed about 7.0 microinches per inch per degree F. measured over the temperature range 0° to 1200° F. The porous chromium-base filter has an average coefficient of expansion over the range of 0° to 1200° F. of about 6 microinches per inch per degree F.

Heat resistant metals or alloys such as ferritic chromium stainless steels have been found particularly adaptable as structural filter frames in the production of filter assemblies with chromium-base filter plates. Ferritic stainless steel Type 430 has given good results as a filter frame section when joined with a chromium-base filter plate in that the expansion coefficient for Type 430 is compatible with that for the porous filter plate.

Other examples of ferritic stainless steels which are also suitable as filter supporting structures are Types 443 and 446. In general such ferritic stainless steels will have an average coefficient of expansion falling within the range of about 6 to 6.3 microinches per inch per degree F. over the temperature range 0° to 1200° F. Porous chromium-base filter plates can be joined to such steels and other heat resistant metals without substantially thermally cracking or otherwise failing either by brazing or by employing a suitable sealing compound. The nominal composition of such steels are as follows:

| Type | Percent C | Percent Cr | Percent Cu | Percent Fe |
|---|---|---|---|---|
| 430 | 0.12 max | 14.0 to 18.0 | | Bal. |
| 443 | 0.20 max | 18.0 to 23.0 | 0.90 to 1.25 | Bal. |
| 446 | 0.35 max | 23.0 to 27.0 | | Bal. |

In joining porous plates of chromium-base materials to each other, a thin layer of minus 200-mesh electrolytic chromium powder has been found satisfactory as the joining material. Two strips of porous chromium-base material were positioned in contact with each other separated by a thin layer of the aforementioned chromium powder and pressed together in a protected graphite mold at about 1300° F. for about one minute. A good joint was obtained.

Various embodiments of filter assemblies within the scope of the invention comprised of supporting structures are illustrated in Figs. 1, 2, 3, 5, 6 and 7. Fig. 1 shows a filter assembly comprising a plurality of porous chromium base filter plates 1 joined to each other at their butt ends 2 and joined to a Type 430 stainless steel frame 3 which has a pipe nipple connection 4 at the exit and through which the material being filtered flows in leaving the filter assembly.

Figure 2:
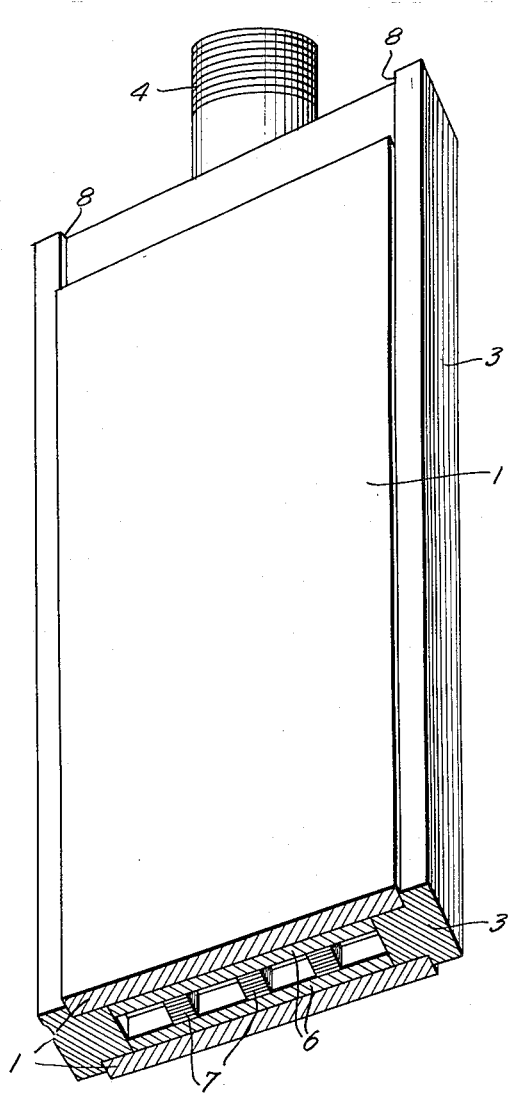
Fig. 2 is an end section of Fig. 1 taken along the line 2—2 looking in the direction of the arrows.

Fig. 2 illustrates a cut-away end portion of the filter assembly of Fig. 1 looking in the direction of the arrows 2—2 and shows locating recess 8 to receive filter plate 1. The cut-away end shows cross-section of frame connecting bridge 6 supported by bracing blocks 7 and also shows cross-section of filter plate 1.

Fig. 3 illustrates an embodiment of a hollow cylindrical filter assembly comprising a plurality of hollow cylindrical segments of porous chromium-base filter elements 9 joined and fitted to each other by a dove-tail interlock 10 and assembled between a top cover plate 14 and a bottom base plate 13 of solid ferritic stainless steel, the base plate being welded at 18 to a ferritic stainless steel tube 11 having perforations 12, said tube running upwardly through the center of the cylindrical filter through the cover plate with a snug fit 19, the end of said tube having the threaded portion 16 with an adjustable lock nut 15 in pressing contact with a bell type cover 17 comprised of a high expansion alloy capable of maintaining a substantially tight fit throughout the assembly at elevated temperatures.

In producing a part for a filter assembly, two curved porous filter plates were produced measuring about 6 inches long by 3 inches wide by ⅛ of an inch thick. The curvature of the plate was such that a transverse cross section showed an outer convexed surface and an inner concaved surface. The two plates were joined by contacting them together with their respective concaved surfaces opposing each other. The plates were joined at their contact points at the edges by employing a boron-containing nickel-chromium alloy powder as the brazing material. The two pieces were brazed together by applying a moderate pressure of about 0.05 p. s. i. at a temperature of 1130° C. for 5 minutes in hydrogen. The results obtained were satisfactory. Fig. 4 shows a completed part of a porous filter unit produced in the aforementioned manner. Of course, it is appreciated that many ramifications of filter structures may be produced from the porous chromium-base filter materials described and disclosed herein. For example, flat porous chromium-base filter plates or porous filter plates of other shapes can be employed in producing large filter assemblies. Likewise, hollow cylindrical segments of porous chromium-base filters can be employed in forming a hollow cylindrical filter assembly.

Figure 5:
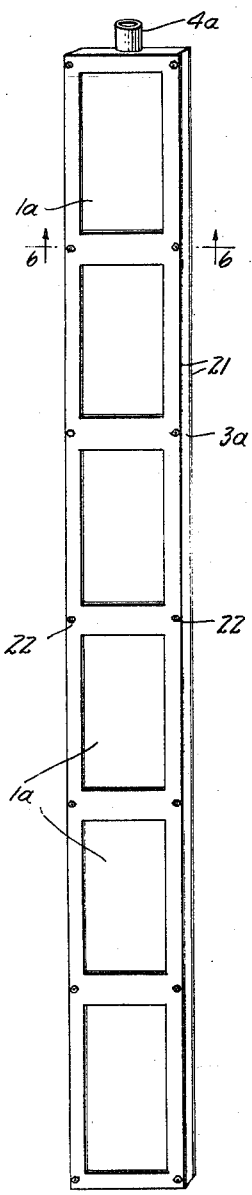
Fig. 5 illustrates another embodiment of a filter assembly comprised of porous filter plates of chromium-base material produced in accordance with the invention.

Fig. 5 shows another embodiment of a filter assembly comprising a plurality of porous chromium-base filter plates 1a held tightly against a Type 430 stainless steel frame 3a by means of a similar stainless steel clampdown frame 21 clamped into position by clamping screw 22.

Figure 6:
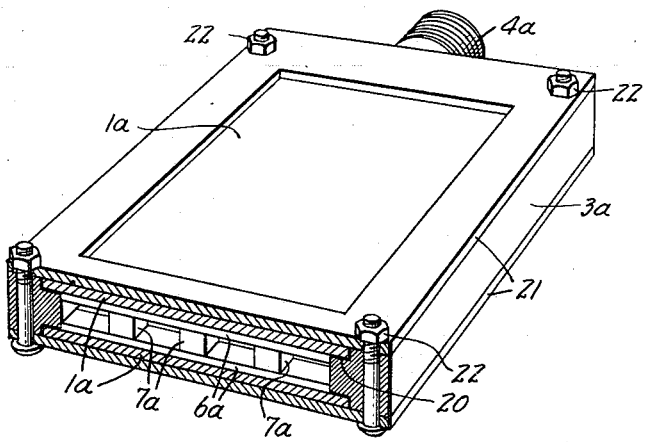
Fig. 6 is an end section of Fig. 5 taken along the line 6—6 in direction of the arrows.

Fig. 6 illustrates a cut-away end portion of the filter assembly of Fig. 5 looking into the direction of the arrows 6—6 and shows cross-section of machined recess 20 in frame 3a against which filter plate 1a is held in position in contact with a sealing compound by clampdown frame 21 and bolt 22. The cut-away end also shows cross-section of filter plate 1a supported by frame connecting bridge 6a which is in turn supported by bracing blocks 7a.

Figure 7:
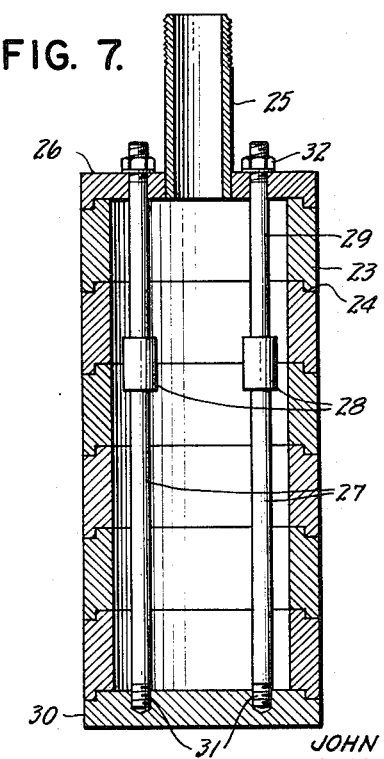
Fig. 7 illustrates another embodiment of a cylindrical type filter assembly comprising cylindrical porous filter segments of chromium-base material produced in accordance with the invention.

Fig. 7 is a further embodiment of a hollow cylindrical filter assembly comprising a plurality of hollow cylindrical segments of porous chromium-base filter elements 23 joined and fitted to each other by a dove-tail interlock 24 with a sealing compound and assembled between a top cover plate 26 having a pipe nipple connection 25 and a bottom base plate 30 of solid ferritic stainless steel, the base plate 30 and cover plate 26 being held in position by means of tie rods comprising a tungsten portion 29 and a ferritic stainless steel portion 27 joined by threaded coupling 28, the tie rods holding the base and cover plates in position by a screw fit 31 in base plate 30 and by an adjustable lock nut 32 in pressing contact with cover plate 26. The ratio of length of the stainless portion of the tie rod to the tungsten portion is approximately 2 : 1 in order that the overall coefficient of expansion of the tie rod will be compatible with that of the chromium-base filter material.

While the porous chromium-base filter plate produced in accordance with the invention is particularly applicable to the filtering of solid particles from corrosive sulfur-containing gases, for example in the pyrolysis or cracking of hydrocarbons, it may be employed in other corrosive media such as in the filtering of hot sulfite solutions in the pulp industry, the filtering of hot flue gases under oxidizing conditions at temperatures up to 800° C., etc.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A method for producing a porous body from a powdered metal containing at least 80% chromium which comprises nitrogen-stabilizing said powder and hot pressing said stabilized powder to a predetermined volume at a pressure at least sufficient to overcome the resistance of the powder to packing at a temperature of at least about 1300° C. for a time sufficient to obtain a coherent porous body characterized by improved resistance to heat shock.

2. A method for producing a porous body from a chromium-base metal comprising providing a powder of the metal in the nitrogen-stabilized condition containing at least about 85% chromium, at least 4% nitrogen and having a particle size distribution falling within the range of minus 60-mesh to plus 200-mesh and hot pressing said nitrogen-stabilized powder to a predetermined volume at a pressure at least sufficient to overcome the resistance of the powder to packing at a temperature falling within the range of about 1350° C. to 1450° C. for a time sufficient to obtain a coherent porous body having an apparent density corresponding to about 50% to 80% of the density of the stabilized chromium-base material and characterized by improved resistance to heat shock.

3. A method for producing a porous filter element from a chromium-base metal comprising providing a powder of the metal in the nitrogen-stabilized condition containing 85% to 91% chromium, 4% to 9% nitrogen, up to 2% carbon, up to 3% oxygen and having a particle size distribution falling within the range of minus 60-mesh to plus 200-mesh; hot pressing said nitrogen-stabilized powder to a predetermined volume at a pressure at least sufficient to overcome the resistance of the powder to packing at a temperature falling within the range of about 1350° C. to 1450° C. for about 7 to 20 minutes followed by a sintering heat treatment in a non-oxidizing atmosphere at a temperature of about 1100° C. to 1500° C. for about 10 to 60 minutes, whereby a coherent porous filter element is produced having an apparent density corresponding to about 60% to 75% of the density of the nitrogen-stabilized chromium-base material and having a modulus of rupture of at least 10,000 p. s. i. and improved resistance to thermal shock.

4. A method for producing a porous body of controlled porosity from a chromium-base metal comprising providing a powder of the chromium-base metal comprising at least 80% chromium and having a particle size distribution falling within the range of minus 60-mesh to plus 200-mesh, subjecting said chromium-base powder to a nitrogen-stabilizing heat treatment at a temperature of at least about 1300° C. in a nitrogen-containing atmosphere for a time sufficient to effect a weight increase of the powder amounting to at least about 10%, producing from said nitrogen-stabilized material a particle size distribution falling within the range of about minus 60-mesh to plus 200-mesh, hot pressing said nitrogen-stabilized powder to a predetermined volume at a pressure at least sufficient to overcome the resistance of the powder to packing at a temperature of at least about 1300° C. for a time sufficient to obtain a coherent porous body having improved resistance to heat shock and having an apparent density corresponding to about 50% to 80% of the density of the nitrogen-stabilized chromium-base material.

5. A method for producing a porous body of controlled porosity from a chromium-base metal comprising providing a powder of a chromium-base metal comprising at least 85% chromium and having a particle size distribution falling within the range of minus 60-mesh to plus 200-mesh, subjecting said chromium-base powder to a nitrogen-stabilizing heat treatment at a temperature within the range of about 1300° C. to 1500° C. in a nitrogen-containing atmosphere for about 15 to 60 minutes to effect a weight increase of the powder amounting to about 10% to 15%, producing from said nitrogen-stabilized material a particle size distribution falling within the range of about minus 60-mesh to plus 200-mesh, hot pressing said nitrogen-stabilized powder to a predetermined volume at a pressure at least sufficient to overcome the resistance of the powder to packing at a temperature of about 1350° C. to 1450° C. for about 7 to 20 minutes, whereby a coherent porous body is produced having improved resistance to heat shock and having an apparent density corresponding to about 50% to 80% of the density of the stabilized chromium-base material.

6. A method for producing a porous filter element of controlled porosity from a chromium-base metal comprising providing a powder of a chromium base material containing at least 98% chromium and having a particle size distribution falling within the range of minus 60-mesh to plus 200-mesh, subjecting said chromium-base powder to a nitrogen-stabilizing heat treatment at a temperature within the range of about 1300° C. to 1500° C. in a nitrogen-containing atmosphere for about 15 to 60 minutes to effect a weight increase of the powder amounting to about 10% to 15%, producing from said nitrogen-stabilized material a particle size distribution falling within the range of about minus 60-mesh to plus 200-mesh, hot pressing said nitrogen-stabilized powder to a predetermined volume at a pressure at least sufficient to overcome the resistance of the powder to packing at a temperature of about 1350° C. to 1450° C. for about 7 to 20 minutes followed by a sintering heat treatment in a non-oxidizing atmosphere at a temperature of about 1100° C. to 1500° C. for about 10 to 60 minutes, whereby a porous filter element is produced having improved resistance to heat shock and having an apparent density corresponding to about 60% to 75% of the density of the stabilized chromium-base material and having a modulus of rupture of at least 10,000 p. s. i.

7. A sintered porous body comprising a nitrogen-stabilized chromium-base metal material containing about 85% to 91% chromium, about 4% to 9% nitrogen, up to about 2% carbon and up to about 3% oxygen, said porous body having an apparent density corresponding to about 50% to 80% of the density of the chromium-base material and having improved resistance to heat shock.

8. A sintered porous filter element comprising a nitrogen-stabilized chromium-base metal material containing at least about 85% chromium and at least about 4% nitrogen and having an apparent density corresponding to about 50% to 80% of the density of the chromium-base material and a permeability factor equivalent to a value of about 0.3 to 2.0 determined across an approximately one-eighth inch cross-section, the sintered porous filter element characterized by being substantially resistant to heat shock and by being capable of forming a sealed joint with heat resistant metal having an average coefficient of linear thermal expansion over the temperature range of 0° to 1200° F. of at least about 5 but not exceeding 7 microinches per inch per degree F.

9. A structural filter assembly comprising at least one sintered nitrogen-stabilized chromium base filter element characterized by improved resistance to heat shock with at least a portion of a heat resistant metal supporting structure joined thereto, said nitrogen-stabilized chromium-base filter element containing about 85% to 91% chromium, about 4% to 9% nitrogen, up to about 2% carbon, up to about 3% oxygen, and having an apparent density corresponding to about 60% to 75% of the density of the chromium-base material, a permeability factor equivalent to about 0.3 to 2.0 determined across an approximately one-eighth inch cross-section and a room temperature modulus of rupture strength of at least about 10,000 p. s. i., said heat resistant metal of said supporting structure having an average coefficient of linear thermal expansion over the temperature range of 0° to 1200° F. of at least about 5 but not exceeding 7 microinches per inch per degree F.

10. A hollow structural filter assembly formed of a plurality of sintered porous bodies of the type defined in claim 7, said porous bodies being held in end to end abutting relationship by means of a heat resistant metal framework characterized by an average coefficient of linear thermal expansion over the temperature range of 0° to 1200° F. of about 5 to 7 microinches per inch per degree F.

11. The hollow filter assembly as defined in claim 10 wherein the assembly is substantially rectangular in shape and wherein the filter porous bodies making up the assembly are substantially flat and rectangular.

12. The hollow filter assembly as defined in claim 10 wherein the assembly is substantially cylindrical and wherein the porous bodies making up the assembly comprise hollow cylindrical segments held by said framework in abutting relationship.

References Cited in the file of this patent

UNITED STATES PATENTS

| | | |
|---|---|---|
| 1,620,815 | Herschkowitsch et al. | Mar. 15, 1927 |
| 1,864,567 | Walter | June 28, 1932 |
| 1,922,315 | Mooz | Aug. 15, 1933 |
| 2,206,395 | Gertler | July 2, 1940 |
| 2,213,523 | Jones | Sept. 3, 1940 |
| 2,297,817 | Truxell et al. | Oct. 6, 1942 |
| 2,377,882 | Hensel | June 12, 1945 |
| 2,397,831 | Bellamy | Apr. 2, 1946 |
| 2,554,343 | Pall | May 22, 1951 |
| 2,592,972 | Strassheim | Apr. 15, 1952 |
| 2,593,943 | Wainer | Apr. 22, 1952 |